Aug. 28, 1951   T. F. VICTORY   2,565,638
THERMAL CONTROL FOR ELECTRICALLY HEATED APPLIANCES
Filed March 8, 1949

INVENTOR.
Thomas F. Victory
BY
ATTORNEYS

Patented Aug. 28, 1951

2,565,638

UNITED STATES PATENT OFFICE 2,565,638

THERMAL CONTROL FOR ELECTRICALLY HEATED APPLIANCES

Thomas F. Victory, Woodside, N. Y., assignor to S. W. Farber, Inc., a corporation of New York Application March 8, 1949, Serial No. 80,150

4 Claims. (Cl. 219—43)

This invention relates to improvements in apparatus for thermostatically controlling temperatures. More particularly, it relates to improvements in temperature control apparatus forming part of electric coffee makers and similar electric culinary equipment.

The patent to H. K. Foster No. 2,217,474 issued October 8, 1940, discloses a coffee maker having an electric heating element controlled by a thermostatic switch mounted in a heat-conducting support that is in contact with the bottom of the main receptacle of the coffee maker. Between the support and the thermostat unit there is provided a layer of heat insulating material having a predetermined value such that it produces a lag in the transmission of heat from the receptacle to the thermostat unit calculated to delay opening of the thermostatic switch and deenergization of the heating element until after the heating element has had sufficient time to heat the water in the coffee maker to coffee-brewing temperature and maintain it at that temperature until the coffee is brewed. When the brewed coffee cools somewhat, the thermostatic switch closes and again energizes the heating element, but this time, since a considerable amount of heat has already reached the thermostat unit and the thermal lag produced by the insulating material has in effect been eliminated, the thermostatic switch will reach the temperature at which it opens sooner than in the first instance and the heating element will therefore remain energized for only a relatively short period. Continued cyclic operation of the thermostatic switch will then maintain the brewed coffee at a predetermined temperature level as long as the coffee maker is connected to the electric power supply.

Electric coffee makers of the so-called vacuum type embodying thermal control means of the kind covered by the above-mentioned Foster patent will automatically brew coffee and maintain the brewed coffee hot by (1) heating water placed in the main receptacle until most of it is forced into the brewing compartment containing the ground coffee, (2) causing the water to be maintained in the brewing compartment for a sufficient interval of time at the desired maximum brewing temperature to effect the brewing operation, (3) allowing the brewed coffee to flow from the brewing compartment into the main receptacle upon deenergization of the heating element by the delayed opening of the thermostatic switch as above described, and (4) keeping the brewed coffee in the main receptacle hot (as long as current is supplied to the coffee maker) by the above-mentioned cyclic operation of the thermostatic switch which then occurs. The cyclic operation of the thermostatic switch after its first opening is intended to maintain the brewed coffee at a temperature sufficiently low to prevent a repetition of the brewing cycle, i. e., forcing of the brewed coffee back into the brewing compartment. The maintained temperature of the brewed coffee, however, is usually only slightly lower than that reached initially in the brewing process. It is therefore possible that any unintentional delay in the opening of the thermostatic switch during its cyclic operation that maintains the brewed coffee hot, such as momentary sticking or freezing of the contacts, might raise the temperature of the brewed coffee to the level at which it will be forced back into the brewing compartment. It is the principal object of this invention to improve apparatus of the kind disclosed in the above-mentioned Foster patent so that the maintained temperature of the brewed coffee will be far enough below the temperature required to force the receptacle contents into the brewing compartment to make re-brewing or forcing of the brewed coffee back into the brewing compartment impossible or most unlikely.

This object is attained by associating with the thermostatic switch an auxiliary heating element which is ineffective when the thermostatic switch is closed but becomes effective to produce heat when the thermostatic switch opens. The auxiliary heating element is positioned close to the thermostatic switch and has a heating capacity so chosen as to cause the additional heat imparted by it to the thermostatic switch to prolong the open periods of the switch by an amount which will cause the desired reduction in the maintained temperature of the brewed coffee.

Other objects and advantages of the invention will be apparent as it is better understood from the following description and the accompanying drawing, in which.

Figure 1:
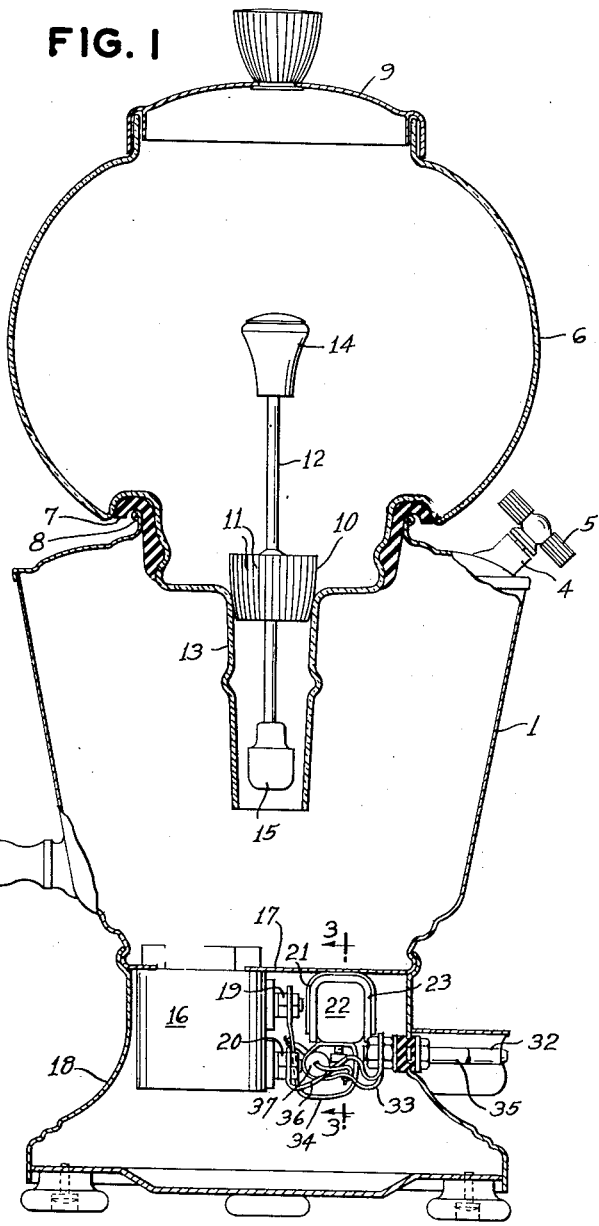
Figure 1 shows in vertical section a coffee maker of the vacuum type embodying the invention.

Referring first to Fig. 1, the coffee maker has a main receptacle 1 adapted to contain the water from which the beverage is to be made and the beverage after it has been brewed. The receptacle is provided with a faucet 2 having a valve handle 3, and a vent valve 4 which may be opened and closed by turning a handle 5.

A container 6 of glass or other suitable material is mounted above the receptacle 1 and constitutes the brewing compartment in which is placed the ground coffee from which the beverage is to be brewed. A gasket 7 of rubber or other suitable resilient material provides a seal between the container 6 and a flange 8 on the receptacle 1. A removable cover 9 is provided to close the opening at the top of the container 6. A filter element 10 having external corrugations 11, is mounted on a rod 12 and is supported at the entrance to a depending funnel portion 13 on the container 6. This funnel portion extends down into the receptacle 1 as shown. A knob 14 at the upper end of the rod 12 facilitates positioning and removal of the rod and its filter element 10, and a weight 15 at the lower end of the rod 12 serves to maintain the filter element 10 seated at the entrance to the funnel portion 13.

An electric heating element (not shown) is located within a sealed housing 16 which is mounted in the bottom 17 of the receptacle 1 and projects therefrom downwardly into a base portion 18 on the receptacle. Terminals 19 and 20 electrically connected to the heating element within the housing 16 are provided so that the heating element can be connected in an electric circuit as hereinafter described.

Also supported on the bottom 17 of the receptacle by soldering or otherwise and in full heat transfer relation therewith is a metal clip 21 within which a housing 22 is mounted that contains a thermostatic switch which controls the supply of current to the heating element within the housing 16. The housing 22 of the thermostatic switch is preferably made of heat insulating ceramic material. Surrounding three sides of the housing 22 is a layer of heat insulating material 23 such as asbestos.

Figure 2:
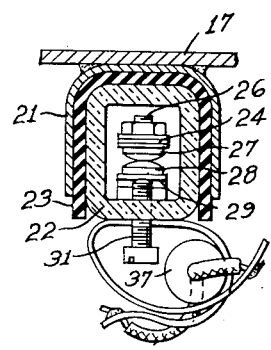
Fig. 2 is an enlarged transverse vertical section through the thermostat unit and a portion of the bottom wall of the main receptacle and illustrates principally the relation between these parts.
Figure 3:
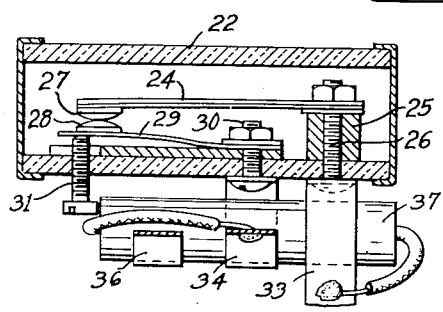
Fig. 3 is a vertical longitudinal section through the thermostatic switch and its housing taken on the line 3—3 of Fig. 1.

The thermostatic switch within the housing 22 is best shown in Figs. 2 and 3. It comprises a bi-metal strip 24 which is mounted at one end on a post 25 by a bolt 26 which passes through the post and the bottom wall of the housing 22. The other end of the bi-metal strip carries an electric contact 27. A cooperating contact 28 is carried at the distal end of a resilient conducting arm 29 secured at its other end to the bottom wall of the housing 22 by a bolt 30. The resilient arm 29 is adjustable by means of a screw 31 to vary the position of the contact 28 and thereby adjust the setting of the thermostatic switch. The bolt 26 is electrically connected to one of the circuit terminals 32 on the coffee maker by means of an electric conductor 33, and the bolt 30 is electrically connected to the terminal 19 of the heating element by means of an electric conductor 34. The other terminal 20 of the heating element is electrically connected to the other terminal 35 of the coffee maker by a conductor 36. The three electric conductors 33, 34 and 36 are preferably, though not necessarily, in the form of flat strips.

The thermostatic switch is normally closed, i. e., the contacts 27 and 28 are normally in engagement with each other, and heat applied to the bi-metal strip 24 causes it to move in a direction to separate the contacts, i. e., to open the thermostatic switch.

The coffee maker as thus far described functions the same way as the coffee maker disclosed in the above-mentioned Foster patent to automatically brew coffee and maintain the brewed coffee hot when the terminals 32 and 35 on the coffee maker are connected to a source of electric current. The faucet 2 and the vent valve 4 are closed and a supply of water is placed in the receptacle 1. The ground coffee from which the beverage is to be brewed is placed in the container 6. When the water in the receptacle reaches a certain temperature as a result of the heat imparted to it by the heating element in the housing 16 the water will start rising through the funnel 13 into the container 6 due to the pressure built up in the receptacle 1 above the surface of the water therein. After all of the water has risen into the container 6 except a residual amount below the lower end of the funnel 13, the residual water in the receptacle will start to boil if it has not already reached the boiling point. The vapors passing up into the container 6 will keep the water and the ground coffee agitated to assist the brewing process. The insulating material 23 around the housing of the thermostatic switch has a predetermined value such that there will be a lag in the transmission of heat from the bottom of the receptacle 1 to the thermostatic switch of sufficient duration to prevent the thermostatic switch from opening until the water has been forced up into the container 6 and has been caused to remain therein during a brewing period of predetermined duration, say two or three minutes. At the end of this time enough heat has reached the thermostatic switch to open it and substantially de-energize the heating element. The subsequent cooling of the residual water in the receptacle 1 and the condensation of the water vapor above its surface then causes a reduction in pressure in the receptacle which draws the brewed coffee from the container 6 down into the receptacle, the coffee grounds being retained in the container 6 by the filter element 10. When the brewed coffee in the receptacle 1 cools to a temperature at which the heat imparted to the thermostatic switch is no longer sufficient to keep it open the switch will close and again allow the entire current to pass through the heating element in the housing 16. This time the heating element will remain energized for a relatively short period only since the thermostat unit and the insulating material 23 are already hot and the thermal lag produced by the heat insulating material has, in effect, been eliminated and therefore the thermostatic switch will open much sooner after its closing than it opened in the first instance after the current was first supplied to the coffee maker. Continued cyclic operation of the thermostatic switch will then maintain the brewed coffee in the receptacle 1 hot at a predetermined temperature level as long as current is supplied to the coffee maker.

Figure 4:
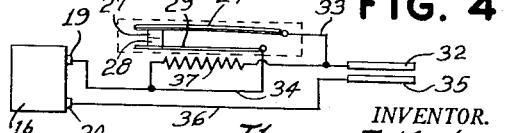
Fig. 4 is a schematic wiring diagram illustrating principally how the auxiliary heating element is electrically connected across the contacts of the thermostatic switch.

As above stated, the maintained temperature of the brewed coffee is usually only slightly lower than the temperature reached initially in the brewing process and therefore there is a possibility that any unintentional delay in the opening of the thermostatic switch during its cyclic operation that maintains the brewed coffee hot, such as momentary sticking or freezing of the contacts 27 and 28, might cause the brewed coffee to be forced back into the brewing compartment in the container 6. To prevent this from occurring, I associate with the thermostatic switch an auxiliary heating element shown at 37. It may be an electric resistor similar to those used in radio circuits. The supply of current to the auxiliary heating element is so controlled by the thermostatic switch that in the normal closed position of the switch the auxiliary heating element is ineffective, but when the thermostatic switch opens then the auxiliary heating element is energized and radiates heat. This is preferably accomplished as best shown in Fig. 4 by connecting the auxiliary heating element across the contacts 27 and 28 of the thermostatic switch so that it is short-circuited when the thermostatic switch is closed and thereby rendered ineffective but is energized when the thermostatic switch opens. The auxiliary heating element is positioned close enough to the thermostatic switch to impart heat to it when the auxiliary heating element is energized. The additional heat thus imparted to the thermostatic switch each time the switch opens serves to keep it open for a longer period of time than would be the case without the auxiliary heating element. In other words, during the cyclic operation of the thermostatic switch that maintains the brewed coffee hot, each time the switch opens and substantially deenergizes the main heating element the cooling beverage will not lower the temperature of the thermostatic switch to the point where the switch again closes as soon as would be the case without the auxiliary heating element. The provision of the auxiliary heating element therefore causes the open periods of the thermostatic switch to be longer and causes the main heating element to be completely energized less frequently, thereby reducing the maintained temperature of the brewed coffee in the receptacle 1. The greater the heating effect of the auxiliary heating element on the thermostatic switch, the lower will be the maintained temperature of the brewed coffee.

The substantial deenergization of the main heating element, above referred to, is caused by the removal of the short around the auxiliary heating element. The current through the main heating element is substantially reduced by the added resistance of the auxiliary heating element then in the circuit. As a matter of fact, the current through the main heating element drops so low that the heating effect of the main heating element is practically zero.

Thus, the brewed coffee in the receptacle 1 can be maintained at any desired temperature level by selecting for the auxiliary heating element a resistor having the proper ohmic value. For example, if the resistor has a resistance of 6800 ohms it would consume about 2 watts at 120 volts, and when such a resistor is positioned relative to the thermostatic switch substantially as shown in the drawing, it will maintain the brewed beverage at a temperature of about 185° F. A 3000 ohm resistor consuming about 5 watts at 120 volts would result in a maintained temperature of the brewed beverage of about 155° F. The resistor is preferably selected so that the maintained temperature of the brewed beverage is in the neighborhood of 175° to 185° F., this temperature being sufficiently lower than that reached initially in the brewing process to prevent re-brewing, i. e., forcing of the brewed coffee back into the brewing compartment.

Because of the lower maintained temperature level of the brewed coffee only an extremely prolonged closed period of the thermostatic switch could cause a temperature to be reached at which such a re-brewing action would occur. The use of the auxiliary heating element not only reduces or eliminates the possibility of a re-brewing action but it provides means for maintaining the brewed beverage at a temperature which is low enough to be a suitable beverage temperature.

It should be noted that the auxiliary heating element has little or no effect in heating the brewed coffee in the receptacle 1. It supplies only enough heat to create a temperature differential between the thermostat and the brewed coffee. It therefore does not constitute an auxiliary heater to maintain the brewed coffee hot and which is thrown permanently into circuit in place of the main heating element. In such an arrangement a constant supply of heat would be imparted continuously to the brewed coffee by the auxiliary heater and this would not necessarily maintain the brewed coffee at a constant temperature level since its temperature could be affected by the temperature of the room, drafts, etc. The main heating element is utilized to maintain the brewed coffee at the desired temperature level, and since its heating effect is thrown into and substantially out of the circuit by the cyclic operation of the thermostatic switch in accordance with the temperature of the brewed coffee itself, the finished beverage is maintained at the desired temperature level regardless of room temperature, drafts, and other factors which would otherwise tend to affect its temperature.

While the invention is of particular value in connection with vacuum type coffee makers, it may be used in connection with any culinary apparatus where it is desired to maintain the cooked or finished material at a temperature level below that reached during the cooking process. In fact, the invention contemplates thermal control apparatus of the kind illustrated in Fig. 4 regardless of the nature of the device or material to which the heat supply is controlled by the thermostatic switch.

I claim:

1. In a beverage heating device having a receptacle adapted to contain material to be maintained at a temperature not substantially above a predetermined temperature, a main electric heating element associated with said receptacle to heat said material, an electric circuit for conducting electric energy to said main heating element, a thermostatic switch in said electric circuit mounted adjacent said receptacle to receive heat therefrom, said thermostatic switch being so constructed and arranged that in one of its positions the main heating element is fully effective to heat said material and in another of its positions the main heating element is substantially ineffective to heat said material, said thermostatic switch being movable from said one position to said other position when its temperature rises above said predetermined temperature and movable from said other position to said one position when its temperature drops below said predetermined temperature, and an auxiliary electric heating element mounted adjacent said thermostatic switch and being so connected in parallel with said thermostatic switch that said auxiliary heating element is effective to supply heat to said thermostatic switch only when said thermostatic switch is in said other position, said auxiliary heating element being so constructed and arranged that the heat of said material decreases to a temperature substantially below said predetermined temperature before the temperature of said thermostatic switch drops below said predetermined temperature, whereby said material is subjected to a cyclic heating action during which the material is heated substantially to said predetermined temperature when said thermostatic switch is in said one position, said thermostatic switch then moves to said other position and said material is allowed to cool substantially below said predetermined temperature before said thermostatic switch is moved to said one position to again allow the main heating element only to heat the material.

2. The apparatus defined in claim 1 in which said main heating element is in series with the parallel combination of said thermostatic switch and said auxiliary heating element, said thermostatic switch being closed in said one position to short-out said auxiliary heating element and being open in said other position.

3. In a beverage heating device having a receptacle adapted to contain material to be maintained at a temperature not substantially higher than a predetermined temperature and a heat-conducting support secured to said receptacle to transmit heat therefrom by conduction, a main electric heating element associated with said receptacle to heat said material, an electric circuit for conducting electrical energy to said main heating element, a thermostatic switch in said electric circuit mounted adjacent said receptacle to receive heat therefrom, said thermostatic switch being so constructed and arranged that in one of its positions the main heating element is fully effective to heat said material and in another of its positions the main heating element is substantially ineffective to heat said material, said thermostatic switch being movable from said one position to said other position when its temperature rises above said predetermined temperature and movable from said other position to said one position when its temperature drops below said predetermined temperature, insulating material of predetermined heat-insulating effect mounted between said support and said thermostatic switch to provide a time delay in transmission of heat from said receptacle to said thermostatic switch, and an auxiliary heating element mounted adjacent said thermostatic switch and being so connected in parallel therewith that said auxiliary heating element is effective to supply heat to said thermostatic switch only when said thermostatic switch is in said other position, said auxiliary heating element being so constructed and arranged that the heat of said material decreases to a temperature substantially below said predetermined temperature before the temperature of said thermostatic switch drops below said predetermined temperature, whereby said material is subjected to a cyclic heating action during which the material is heated substantially to said predetermined temperature when said thermostatic switch is in said one position, said thermostatic switch then moves to said other position and said material is allowed to cool substantially below said predetermined temperature before said thermostatic switch is moved to said one position to again allow the main heating element only to heat the material.

4. In a beverage heating device having a receptacle adapted to contain material to be maintained at a temperature not substantially above a predetermined temperature, a main electric heating element associated with said receptacle to heat said material, an electric circuit including terminals for connection to a source of electric energy for conducting electric energy from said source to said main electric heating element, a thermostatic switch having an open and a closed position and being constructed to switch from said closed to said open position when its temperature exceeds said predetermined temperature and to switch from said open to said closed position when its temperature drops below said predetermined temperature, said thermostatic switch being mounted adjacent said receptacle to receive heat therefrom, said thermostatic switch being so constructed and arranged in said electric circuit that in its closed position it connects said main electric heating element directly across said terminals, an auxiliary electric heating element shunted directly across said thermostatic switch so that when said thermostatic switch is in said closed position said auxiliary electric heating element is shorted, said auxiliary electric heating element being mounted adjacent said thermostatic switch to supply heat thereto, said auxiliary electric heating element being in series circuit relation with said main electric heating element so that when said thermostatic switch is in said open position all electric current passing through said main electric heating element passes through said auxiliary electric heating element, said auxiliary electric heating element having such resistance value that the electric current passing through said main electric heating element is reduced to a value such that said main electric heating element is substantially ineffective to heat said material and said thermostatic switch is heated by said auxiliary electric heater by such an amount that the heat of said material decreases to a temperature substantially below said predetermined temperature before the temperature of said thermostatic switch drops below said predetermined temperature when said thermostatic switch is in said open position, whereby said material is subjected to a cyclic heating action during which the material is heated substantially to said predetermined temperature when said thermostatic switch is in said closed position, said thermostatic switch then moves to said open position and said material is allowed to cool substantially below said predetermined temperature before said thermostatic switch is moved to said closed position to again allow the main heating element to heat the material.

THOMAS F. VICTORY.

REFERENCES CITED

The following references are of record in the file of this patent:

UNITED STATES PATENTS

| Number | Name | Date |
|---|---|---|
| 1,697,040 | Appelberg | Jan. 1, 1929 |
| 1,943,386 | Johnson | Jan. 16, 1934 |
| 2,025,302 | Olds | Dec. 24, 1935 |
| 2,076,096 | Samuels et al. | Apr. 6, 1937 |
| 2,217,474 | Foster | Oct. 8, 1940 |
| 2,262,286 | Ireland | Nov. 11, 1941 |
| 2,281,319 | Newell | Apr. 28, 1942 |
| 2,400,735 | Bradford | May 21, 1946 |
| 2,504,728 | Purpura | Apr. 18, 1950 |